United States Patent [19]

Zatezalo et al.

[11] Patent Number: 4,463,438

[45] Date of Patent: Jul. 31, 1984

[54] SHAFT ALIGNMENT CALCULATOR

[75] Inventors: John M. Zatezalo, Sewickley; Lucian J. Spalla, McMurray, both of Pa.

[73] Assignee: Industrial Maintenance Systems, Inc., Pittsburgh, Pa.

[21] Appl. No.: 329,707

[22] Filed: Dec. 11, 1981

[51] Int. Cl.³ .......................................... G06F 15/46
[52] U.S. Cl. ................... 364/715; 364/709; 364/462; 364/561
[58] Field of Search ............... 364/715, 709, 710, 561, 364/460, 462

[56] References Cited

U.S. PATENT DOCUMENTS

| | | | |
|---|---|---|---|
| 3,976,975 | 8/1976 | Cochran | 364/709 |
| 3,979,057 | 9/1976 | Katz et al. | 364/706 |
| 3,979,058 | 9/1976 | Katz et al. | 364/706 |
| 4,060,719 | 11/1977 | Dalinowski | 364/729 |
| 4,081,859 | 3/1978 | Goldsamt et al. | 364/709 |
| 4,218,755 | 8/1980 | Root | 364/715 |
| 4,234,924 | 11/1980 | Vance et al. | 364/460 |
| 4,382,280 | 5/1983 | Mandel et al. | 364/710 |

OTHER PUBLICATIONS

Durkin, "Aligning Shafts Part I–Measuring Misalignment", *Plant Engineering*, Jan. 11, 1979, pp. 86–90.
Durkin, "Aligning Shafts Part II–Correcting Misalignment", *Plant Engineering*, Feb. 8, 1979, pp. 102–105.

*Primary Examiner*—David H. Malzahn
*Attorney, Agent, or Firm*—Buell, Blenko, Ziesenheim & Beck

[57] ABSTRACT

The specification discloses a calculator for determining the distance that a machine coupled to a second machine must be moved so that the coupled shafts between the machines will be properly aligned. The calculator employs a series of lights and associated identification which indicate to the user what data to enter and the sequence in which to enter data.

6 Claims, 4 Drawing Figures

SHAFT ALIGNMENT CALCULATOR

The invention relates to calculators which are used to determine the relative position of two machines having interconnected drive shafts so that there will be proper alignment between the two shafts.

Wherever two rotating shafts are coupled together it is important that their axis of rotation be the same. Misalignment of the shafts causes vibrations which cause excessive wear and even destruction of couplings, bearings, seals, gears and other components. Today, misalignment is the primary cause of more than 50 percent of all rotating machinery failures in many industries.

There are well known equations which can be used to determine how to adjust the position of two coupled machines so that the interconnected shafts between them are properly aligned. To use the equations one must make certain measurements, insert those measurements in the equations and solve them. The solutions will tell the user how much and in what direction to move the machines so that their shafts will be properly aligned. Although these equations are well known they are seldom used. People in the field are unwilling to take the time to make the necessary measurements and solve the equations. Many are also uncomfortable in using the equations because they fear they will enter the wrong measurements or make other mistakes.

The result is that most alignments are now done by trial and error or visual inspection. The trial and error method is costly and time consuming. Through experience many people have developed a "feel" for proper alignments and rely upon that "feel" to do the job. However, misalignments of a few thousands of an inch cannot be seen, yet they can cause serious damage. Usually an alignment is considered to be proper when it in fact is not.

We have developed a calculator which will tell any mechanic how to align coupled machinery. Through a unique visual display the calculator tells the mechanic what measurements to make and in what order to make them. The mechanic simply enters those measurements in the sequence specified by the calculator and the device will tell him how much to shim the front and back feet of one of the coupled machines so that the coupled shafts will be properly aligned.

Our calculator is easy to use. Any mechanic can be taught to use it in a few short hours. With our calculator it takes only a short time to align equipment and the resulting alignment is usually better than can be achieved using other techniques. Thus, unscheduled downtime and maintenance time are reduced. Because the operating efficiency of coupled shafts is increased by better alignment, less energy is consumed during operation.

Our calculator is compact and easy to transport to and from the jobsite. It can operate on AC or battery power. Because it can be made from off the shelf components and employs printed circuitry it is durable and relatively inexpensive to produce.

Other details, objects and advantages of the invention will become apparent as a description of a present preferred embodiment of the invention proceeds.

In the accompanying drawings, I have shown a present perferred embodiment of the invention in which.

Figure 1:
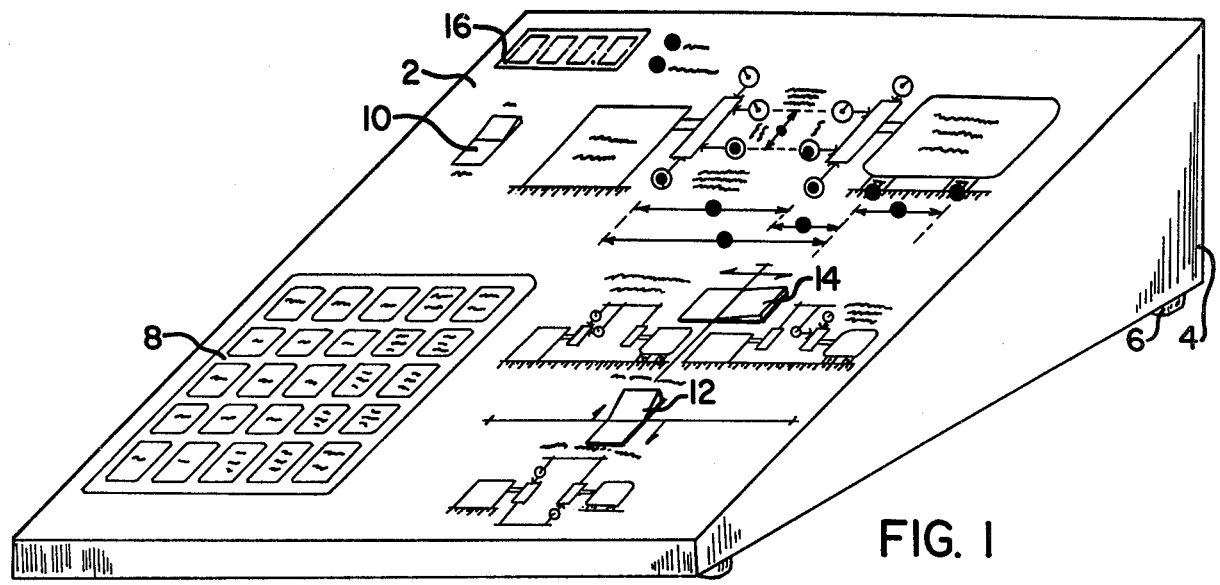
FIG. 1 is a perspective view of a present preferred embodiment of the invention.
Figure 2:
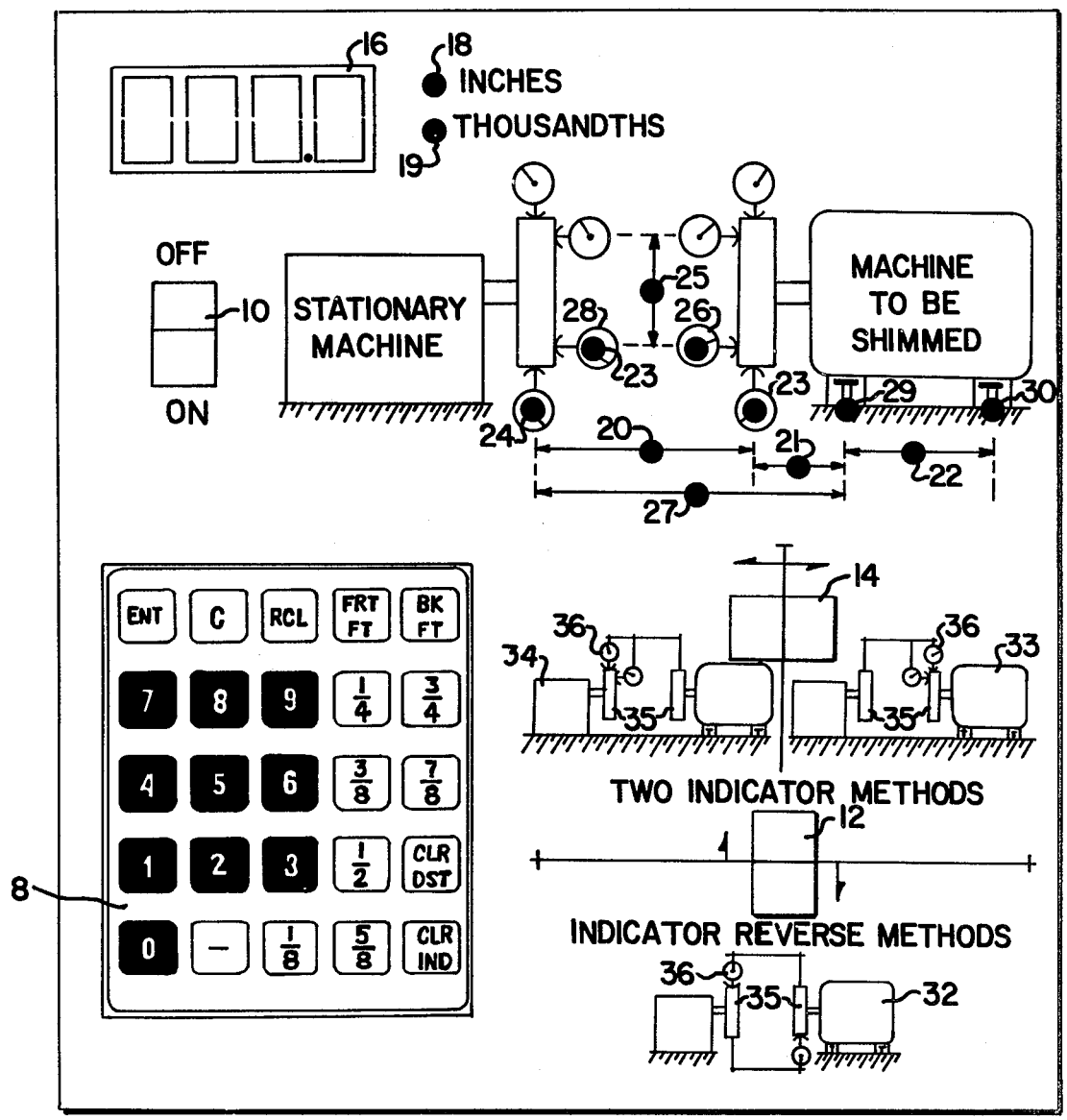
FIG. 2 is a top plan view of the face plate and keyboard of the embodiment of FIG. 1.

Referring to FIGS. 1 and 2, the calculator is comprised of a face plate 2 fitted onto a housing 4 in which the circuitry is contained. Rubber legs 6 are provided on the bottom of the housing. The face of the device contains a keyboard 8, power switch 10, method switches 12 and 14, LCD display 16 and a pluralitiy of light emitting diodes 18 through 30. These diodes light in sequence to tell the user what data to enter. Because measurements are often made in eighths of an inch I prefer to include keys for those fractions in the keybord 8 as shown. One could also use a keyboard which permits decimal entries.

Shaft alignments are determined by measuring the relative position of the two shafts. This can be done by attaching an L-shaped bar to one shaft so that its unattached end is above the second shaft. Then gauges are suspended from the L-shaped bar to engage the second shaft or a clamp attached thereto. The position of the gauges depends upon which equation or method is being used to calculate misalignment. In the indicator reverse method two L-shaped bars are used and one gauge is mounted above each shaft. In the two indicator method two gauges are suspended over one shaft and take measurements at right angles to one another. With the calculator the mechanic can use either method. If he choses the two indicator method he may take his measurements on either shaft. Diagrams 32, 33 and 34 on the face plate 2 of the calculator illustrate the positions of the guages in each of these methods. In these diagrams we show clamps 35 having faces parallel and perpendicular to the shafts to which they are attached. The gauges 36 engage one of the clamp's surfaces as shown.

OPERATION OF THE INVENTION

To operate our calculator the user selects the method he intends to use with switches 12 and 14 then turns on the power with switch 10. If he wishes to use the indicator reverse method he moves the switch 12 toward diagram 32 and ignores switch 14 which is locked out of the circuit. If he wishes to use a two indicator method he moves switch 12 toward switch 14 which activates switch 14. Then he turns switch 14 toward diagram 33 or diagram 34. The switch 14 should be moved toward the diagram 33 or 34 which illustrates the positions in which the mechanic has placed his gauges on the machines to be aligned. Then the mechanic enters measurements and readings in the sequence given by LED's 20 thru 28. After all data has been entered the calculator will make the necessary calculation. Then the mechanic can read in display 16 the amount to shim the front foot of the machine by pressing the front foot (FRT FT) key. To determine how much to shim the back foot of the machine he simply presses the back foot (BK FT) key.

To illustrate the operation of the invention in detail, suppose the mechanic has chosen the indicator reverse method. First he will set his gauges as shown in diagram 32. Then he turns switch 12 toward diagram 32 and the power switch 10 to "ON". At that point LED's 20 and 18 will light. This tells the mechanic to enter the distance in inches between the two gauges. The mechanic presses the appropriate numerical keys on the keyboard and the entry is displayed on display 16. If the display is correct he presses the enter (ENT) key which enters the reading into the calculator's memory, clears the display and causes LED's 18 and 21 to light callng for entry of the next reading. If the mechanic has typed the wrong numbers and the display is incorrect, he can clear the display with the clear (C) key and type in the correct figures. After the first entry has been made LED's 18 and 21 will light to tell the user to enter the distance in inches from the front foot of the machine to be shimmed to the gauge abutting the shaft of that machine. When that entry has been made LED's 18 and 22 light to call for entry of the distance in inches between the front and back feet of the machine to be shimmed. After that figure is entered LED's 19 and 23 light to tell the mechanic to enter the reading in thousandths of an inch from the gauge abutting the shaft of the machine to be shimmed. Next LED's 19 and 24 will light to call for entry of the reading in thousandths from the second gauge. That is the final data entry. After it is made LED's 19 and 29 will light and a number will appear in display 16. That number is the amount in thousandths by which to shim the front foot of the machine to be shimmed. A positive number tells the operator to add shim stock and a negative number means shim stock must be removed. To find the amount to shim the back foot of that machine the operator presses the back foot (BK FT) key. Thereafter, he can press the front foot (FRT FT) key to recall the front foot shim requirement. To check any of the data entries one can use the recall (RCL) key which will recall the data entries in order. As each entry is recalled the appropriate LED's will light to indicate which measurement is being displayed.

To determine the required horizontal movement the mechanic depresses the clear indicator (CLR IND) key which sets the display at zero and causes LED's 19 and 23 to light. The lit LED's tell the mechanic to turn the shaft 90° so the gauges are horizontal, set the gauge nearest the machine to be shimmed to zero, rotate the shaft 180°, read the same gauge and enter that reading. When that entry is made LED's 19 and 24 will light telling the mechanic to follow a similar procedure for the second gauge. Following this entry LED's 19 and 29 will light and a number will appear in display 16. That number is the distance to move the front foot of the machine to be shimmed. If the number is positive the front foot of the machine must be moved away from the side at which the gauge corresponding to LED 23 was located when read. When the back foot (BF FT) key is pressed the distance by which the back foot should be moved will appear in the display and LED's 9 and 30 will light. In using this procedure the user normally will have to adjust his gauges to compensate for indicator sag caused by the bending of the mounting hardware.

The two indicator method works much the same way as the indicator reverse method. The mechanic sets his gauges as shown in diagram 33 or 34 and presses switch 12 toward switch 14 and switch 14 toward the diagram which corresponds to his set-up. Then he turns the power switch to "ON" and enters the measurements or readings indicated by the lit LED's. As each entry is made other LED's will light to indicate the next entry required until all data is entered. Then LED's 19 and 29 will light and the amount to shim the front foot of the machine will appear in the display 16. To find the amount to shim the back foot the operator presses the back foot (BK FT) key and reads the display 16. If the set up of diagram 34 is used the data input LED sequence will be 25 and 18, 27 and 18, 28 and 19, and 24 and 19. For a diagram 33 set up the data input LED sequence is 25 and 18, 21 and 18, 22 and 18, 23 and 19, and 26 and 19.

Should the machine to be shimmed have more than two support points the clear distance (CLR DST) key enables one to determine how much to shim the intermediate feet. After answers have been obtained for the front and back feet the operator presses the clear distance (CLR DST) key. Then LED's 28 and 19 will light to signal that the distance from the front foot to the intermediate foot should be entered. After the operator enters that value LED's 30 and 18 will light and the amount by which the intermediate foot must be shimmed will appear in display 16.

If one discovers that the machine to be shimmed was resting on three rather than four feet the gauge readings will be inaccurate. The clear indicator (CLR IND) key will clear the data which was entered for both gauge readings. Then the user can correct the "soft foot" condition, take new gauge readings and enter the new readings. The distance measurements will be retained by the calculator and need not be entered again.

We prefer to program the calculator to round off all answers to the nearest one-half (i.e. 0.50 thousandths) because the thinnest shim stock available is 0.50 thousandths.

We also prefer to provide interlocks to prevent loss of data and incorrect entries. Once the ON-OFF switch is "ON" the method selector switches are electronically bypassed and movement of these switches has no effect. Thus, the method selected while in the OFF position will continue to function regardless of repositioning of the selector switches. We further prefer to electronically bypass the clear entry (C) key when answers are in the display. The minus (−) key is electronically bypassed when inches measurements are being entered since all such measurements must be positive. Finally, the enter (ENT) key will cause data put in the display to be entered and progression to the next data entry to automatically occur. An interlock is provided so that subsequent depressing of the enter key will not cause progression or any data entry to occur unless new data has been put into the display. This interlock feature helps prevent omission of required data.

THE PREFERRED CIRCUITRY

Figure 3:
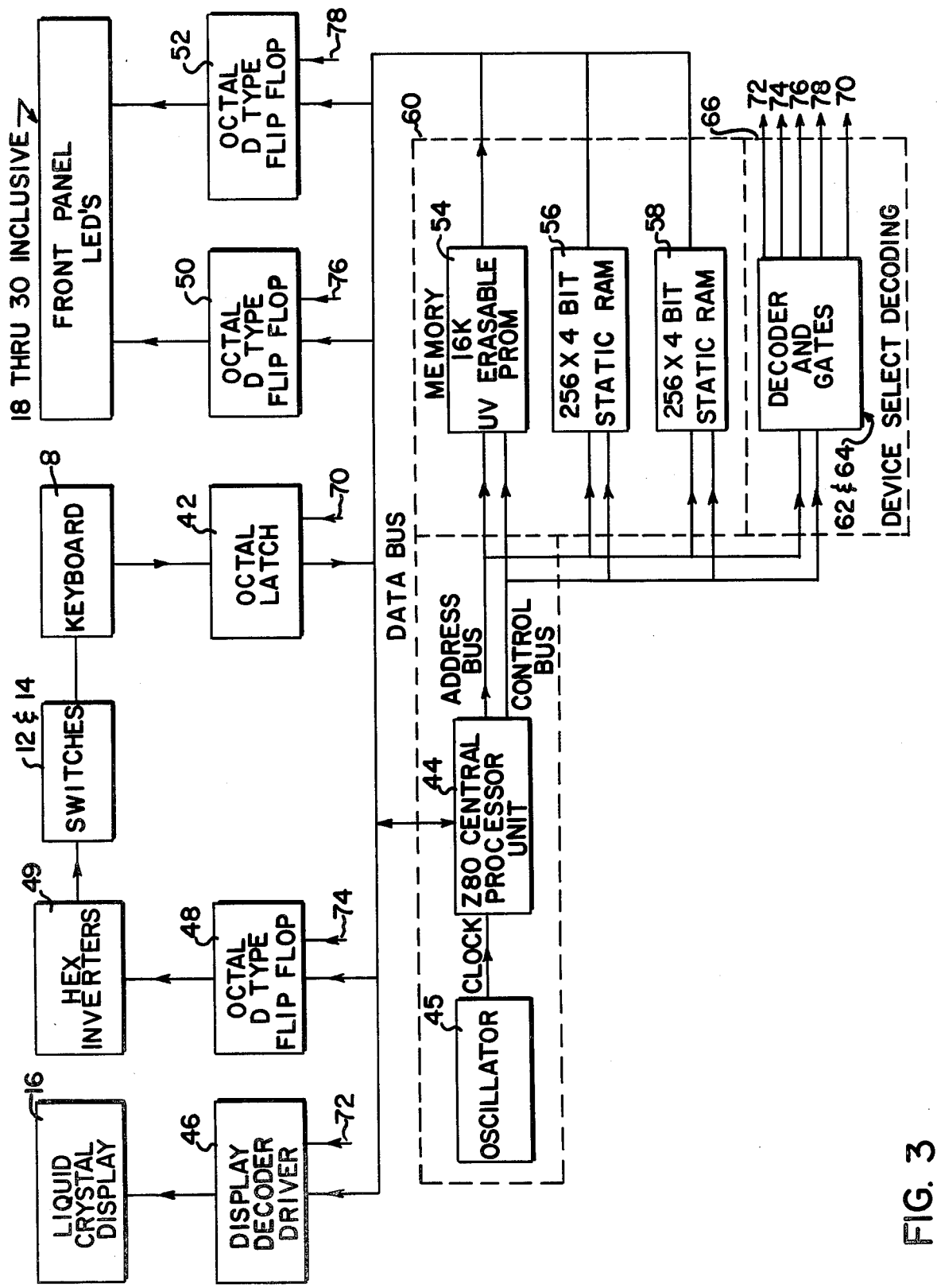
FIG. 3 is a block diagram of a present preferred embodiment of the invention.

FIG. 3 is a block diagram of the preferred circuitry of our invention which illustrates how current flows within the device. A detailed circuit diagram appears in FIG. 4. In this circuit, we prefer to use the components listed in Table I which also contains the reference number given each component in the drawings.

TABLE I

| Drawing Ref. | Part No. | Description |
| --- | --- | --- |
| 8 | KBA 3150 | Bowmar keyboard |
| 16 | FEO206C | AND liquid crystal display |
| 47 | CD4030BE | RCA quad exclusive-or gate |
| 46 | ICM7211AMIPL | Intersil four digit display decoder driver |
| 48, 50, 52 | SN74LS273N | Signetics 8-bit register |
| 42 | SN74LS373N | Signetics 8-bit register |
| 49 | SN7406N | Signetics hex inverter buffer |

TABLE I-continued

| Drawing Ref. | Part No. | Description |
|---|---|---|
| | | driver |
| 45 | SN74LS13N | Signetics dual 4 input schmitt trigger |
| 44 | MK3880N | Mostek Z80 - CPU |
| 54 | IP2716 | Intel 16k (2k × 8) UV erasable PROM |
| 62 | SN74LS139N | Signetics dual 1 - of - 4 decoder |
| 64 | SN74LS32N | Signetics quad 2 input or gate |
| 56, 58 | IP5101L-1 | Intel 256 × 4 bit static CMOS RAM |

Figure 4:
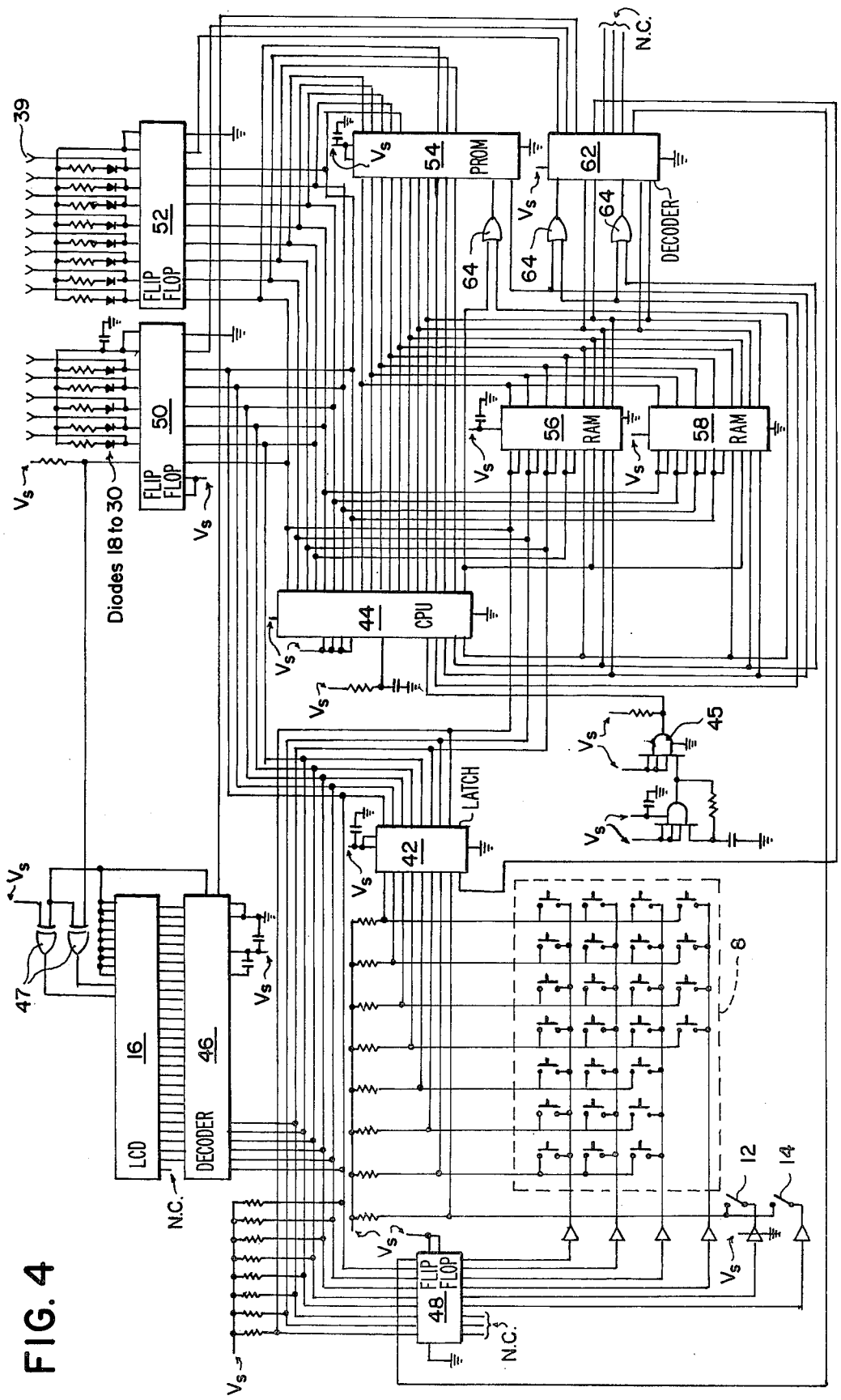
FIG. 4 is a detailed circuit diagram of a present preferred embodiment of the invention.

Referring to FIGS. 3 and 4 the keyboard 8 is connected to latch 42 which in turn is connected to central processing unit 44, display decoder driver 46 and octal D type flip flops 48, 50 and 52. Flip flop 48 is connected to the keyboard 8 and switches 12 and 14, which are used to select the alignment method to be used through hex inverters 49. A display decoder driver 46 and gates 47 are connected to liquid crystal display 16. Flip flops 50 and 52 are connected to LED's 18 thru 30. Terminals 39 can be provided for auxiliary indicators (not shown). A 16K programmable memory 54 and two 256×4 bit static RAM's 56 and 58 form the memory unit 60. CPU 44 inputs into memories 54, 56 and 58 providing the address for the memories and into decoder 62 and gates 64 which form the decoding unit 66. Both the decoding unit 66 and the memory unit 60 are connected to the display decoder driver 46. Decoder 66 connects to latch 42 through wire 70 and to flip flops 48, 50 and 52 through lines 72, 74, 76 and 78 (FIG. 3). Finally a schmitt trigger 45 is wired to the CPU 44 and acts as an oscillator. Terminals of the display 16, flip flop 48 and decoder 62 which are not used are marked "N.C." in FIG. 4.

When the device is turned ON a signal will flow from the CPU 44 and memory unit 60 through the display decoder driver 46 to display 16 so that a zero reading will appear on the display. Simultaneously appropriate LED's 18 thru 30 will light. Data entered through keyboard 40 travels to the display 16 and memory unit 60. When the enter (ENT) key is pressed data in the display is stored in the memory, the display goes to zero and new LEDs are lighted to signal the operator to enter additional data. The programable memory contains the well known equations for determining how much to shim the machine to be aligned. The equations for the Indicator Reverse Method are:

$$\left[(r_{23} + r_{24})\left(\frac{d_{21}}{d_{20}}\right) + r_{23}\right] \div 2 = s_{29}$$

$$\left[(r_{23} + r_{24})\left(\frac{d_{21} + d_{22}}{d_{20}}\right) + r_{23}\right] \div 2 = s_{30}$$

The equations for the two indicator method illustrated in diagram 34 are:

$$\frac{d_{27} \times r_{28}}{d_{25}} - \frac{r_{24}}{2} = s_{29}$$

$$\frac{(d_{27} + d_{22}) r_{21}}{d_{25}} - \frac{r_{24}}{2} = s_{30}$$

The equations for the two indicator method illustrated in diagram 33 are:

$$\frac{d_{21} \times r_{26}}{d_{25}} + \frac{r_{23}}{2} = s_{29}$$

$$\frac{(d_{21} + d_{22}) r_{26}}{d_{25}} + \frac{r_{23}}{2} = s_{30}$$

Where
$d_n$ = the distance shown in FIG. 2 at LED n,
$r_n$ = the reading taken at gauge n in FIG. 2,
$s_{29}$ = the amount to shim the front foot of the machine, and
$s_{30}$ = the amount to shim the back foot of the machine.
As data is entered into the calculator it inserts the data into the appropriate equations and solves them. When the last required data is entered the answer will appear on the display 16 and appropriate LEDs will light to give the units of the numerical answer and indicate to which foot of the machine the answer applies.

While we have shown and described a present preferred embodiment of the invention it is to be disticly understood that the invention is not limited thereto but may be otherwise variously embodied within the scope of the following claims.

We claim:
1. A calculator for calculating distances that two machines coupled to each other must be moved so that shafts coupled between the machines will be in proper alignment comprising:
   a. a keyboard having at least numerical keys for inputting measurement data,
   b. a display connected to the keyboard for displaying numbers typed on the keyboard and numbers calculated therefrom,
   c. a face plate to which the keyboard and display are attached having thereon at least one illustration of two machines having interconnected shafts with gauges mounted thereon,
   d. a memory unit storing a program and capable of storing the input measurement data,
   e. first indicator means attached to the face plate near the illustration to indicate places to be measured in a sequence compatible with the program,
   f. a processing unit connected to the keyboard, memory and display for receiving data entered on the keyboard, calculating the distances that the two machines must be moved according to the program contained in the memory, and transmitting a result to the display,
   g. second indicator means attached to the face plate near the illustration to indicate at least one point where at least one of the machines must be moved, and
   h. a decoding unit connected to the processing unit, display, first and second indicator means, and memory for receiving signals from the processing unit and for actuating the first and second indicator means and the memory.

2. The calculator of claim 1 also comprising a plurality of latches connected to the first and second indicator means, memory unit and decoding unit in a manner so that all signals going to the first and second indicator means will travel through the latches.

3. The calculator of claim 1 wherein the first and second indicator means are light emitting diodes.

4. The calculator of claim 1 wherein the program stored in the memory unit contains information that defines at least three equations which when implemented compute shaft alignment.

5. The calculator of claim 1 wherein the keyboard contains keys labeled in fractions divisible by one-eighth.

6. The calculator of claim 1 wherein the keyboard has an enter key connected to the display, memory and first and second indicator means in a manner such that depression of the enter key will cause data appearing in the display to be stored in the memory and the indicator means to signal the next data to be entered.

* * * * *

UNITED STATES PATENT AND TRADEMARK OFFICE
CERTIFICATE OF CORRECTION

PATENT NO. : 4,463,438
DATED : July 31, 1984
INVENTOR(S) : JOHN M. ZATEZALO and LUCIAN J. SPALLA It is certified that error appears in the above-identified patent and that said Letters Patent is hereby corrected as shown below:

Column 1, line 34, change "thousands" to --thousandths--.

Column 1, line 65, change "I" to --we--.

Column 2, line 32, change "choses" to --chooses--.

Column 3, line 4, change "callng" to --calling--.

Column 4, line 10, change "28 and 19" to --22 and 18--.

Column 6, in the first equation, after $(d_{27} + d_{22})$, change "$r_{21}$" to --$r_{28}$--.

Column 6, line 27, change "distictly" to --distinctly--.

Signed and Sealed this

Twenty-sixth Day of March 1985

[SEAL]

Attest:

DONALD J. QUIGG

Attesting Officer     Acting Commissioner of Patents and Trademarks